US012447851B2

(12) United States Patent
Kimura et al.

(10) Patent No.: US 12,447,851 B2
(45) Date of Patent: Oct. 21, 2025

(54) VEHICLE MANAGEMENT SYSTEM, VEHICLE MANAGEMENT METHOD, AND ENERGY MANAGEMENT SYSTEM

(71) Applicant: HONDA MOTOR CO., LTD., Tokyo (JP)

(72) Inventors: Toru Kimura, Saitama (JP); Hisashi Nagaoka, Saitama (JP); Mutsumi Katayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 18/181,519

(22) Filed: Mar. 9, 2023

(65) Prior Publication Data
US 2023/0286404 A1 Sep. 14, 2023

(30) Foreign Application Priority Data

Mar. 14, 2022 (JP) ................. 2022-039602

(51) Int. Cl.
*B60L 53/62* (2019.01)
*B60L 53/30* (2019.01)
(Continued)

(52) U.S. Cl.
CPC ............. *B60L 53/62* (2019.02); *B60L 53/305* (2019.02); *B60L 53/63* (2019.02); *B60L 53/66* (2019.02); *B60L 53/65* (2019.02)

(58) Field of Classification Search
CPC ........ B60L 53/62; B60L 53/305; B60L 53/63; B60L 53/66; B60L 53/65; B60L 53/67;
(Continued)

(56) References Cited

U.S. PATENT DOCUMENTS

2014/0210638 A1* 7/2014 Gussen .................. B60L 58/14
340/870.09
2016/0016481 A1* 1/2016 Maya ..................... B60L 58/12
340/455
(Continued)

FOREIGN PATENT DOCUMENTS

CN 108482151 A * 9/2018
EP 4122751 A1 1/2023
(Continued)

OTHER PUBLICATIONS

Machine translation of CN-10848215 downloaded from Espacenet Mar. 7, 2025 (Year: 2025).*
(Continued)

*Primary Examiner* — Ramsey Refai
*Assistant Examiner* — Tanya C Sienko

(57) ABSTRACT

Provided is a vehicle management system configured to manage a plurality of vehicles used at an office. Each of the vehicles includes a battery. The vehicle management system includes: a first prediction control unit configured to cause a prediction for an amount of surplus power generated at the office on a non-work day of the office; a second prediction control unit configured to cause a prediction for a power capacity that can be accumulated by each of the plurality of vehicles at the office on the non-work day; and a selection control unit configured to cause a to-be-retained vehicle to be retained at the office on the non-work day to be selected from among the plurality of vehicles on the basis of the amount of surplus power generated at the office on the non-work day and the power capacity.

16 Claims, 10 Drawing Sheets

(51) Int. Cl.
  *B60L 53/63* (2019.01)
  *B60L 53/65* (2019.01)
  *B60L 53/66* (2019.01)

(58) Field of Classification Search
  CPC ...... B60L 55/00; B60L 58/12; B60L 2240/70; B60L 2240/80; B60L 2260/52; B60L 2260/54; B60L 53/68; Y02T 10/70; G06Q 10/04; G06Q 10/063; G06Q 50/06; G06Q 50/40
  See application file for complete search history.

(56) References Cited

U.S. PATENT DOCUMENTS

| | | | | |
|---|---|---|---|---|
| 2016/0291557 | A1* | 10/2016 | Hashimoto | G06Q 50/06 |
| 2019/0232944 | A1 | 8/2019 | Kai | |
| 2020/0231056 | A1 | 7/2020 | Sadano | |
| 2020/0231061 | A1 | 7/2020 | Kanamori | |
| 2021/0061123 | A1* | 3/2021 | Suzuki | H01M 10/425 |
| 2022/0250486 | A1* | 8/2022 | McCalmont | H02J 7/35 |
| 2023/0234467 | A1* | 7/2023 | Shigyo | B60L 58/27 320/106 |
| 2023/0256855 | A1* | 8/2023 | Sartipizadeh | B60L 53/64 320/109 |

FOREIGN PATENT DOCUMENTS

| | | | |
|---|---|---|---|
| JP | H10255162 A | 9/1998 | |
| JP | 2012196028 A | 10/2012 | |
| JP | 2013059173 A | 3/2013 | |
| JP | 2019153114 A | 9/2019 | |
| JP | 2020170300 A | 10/2020 | |
| WO | WO-2013134344 A2 * | 9/2013 | ............ F17C 13/083 |
| WO | 2021187004 A1 | 9/2021 | |

OTHER PUBLICATIONS

Machine translation of WO2021187004-A1 (D1 in EP Search report in IDS) downloaded from Espacenet (with paragraph numbers added) Mar. 5, 2025 (Year: 2025).*

Extended European Search Report for counterpart European Application No. 23157055.7, issued by the European Patent Office on Aug. 10, 2023.

Office Action issued for counterpart Japanese Application No. 2022-039602, transmitted from the Japanese Patent Office on Sep. 2, 2025 (drafted on Aug. 22, 2025).

* cited by examiner

| DAY OF WEEK | TIMING | VEHICLE 70a | VEHICLE 70b | VEHICLE 70c |
|---|---|---|---|---|
| MONDAY | GOING TO WORK | 80a | 80b 80c | - |
| MONDAY | LEAVING WORK | 80a | 80b | 80c |
| TUESDAY | GOING TO WORK | 80a | 80b | 80c |
| TUESDAY | LEAVING WORK | 80a | 80b | 80c |
| WEDNESDAY | GOING TO WORK | 80a | 80b | 80c |
| WEDNESDAY | LEAVING WORK | 80a | 80b | 80c |
| THURSDAY | GOING TO WORK | 80a | 80b | 80c |
| THURSDAY | LEAVING WORK | 80a | 80b | 80c |
| FRIDAY | GOING TO WORK | 80a | 80b | 80c |
| FRIDAY | LEAVING WORK | 80a | 80b 80c | - |
| SATURDAY | HOME | 80a | 80b | - |
| SUNDAY | HOME | 80a | 80b | - |
| MONDAY | GOING TO WORK | 80a | 80b 80c | - |
| MONDAY | LEAVING WORK | 80a | 80b | 80c |

FIG.4

VEHICLE MANAGEMENT SYSTEM, VEHICLE MANAGEMENT METHOD, AND ENERGY MANAGEMENT SYSTEM

The contents of the following Japanese patent application(s) are incorporated herein by reference:
NO. 2022-039602 filed on Mar. 14, 2022.

BACKGROUND

1. Technical Field

The present invention relates to a vehicle management system, a vehicle management method, and an energy management system.

2. Related Art

Conventionally, efforts have been continuously made to achieve effective power utilization and energy saving by using EVs. For example, Patent Document 1 discloses a technique in which an EV used for an employee to commute to work at a factory is used for peak-cut in system cooperation.

CITATION LIST

Patent Document 1: Japanese Patent Application Publication No. 2012-196028

BRIEF DESCRIPTION OF THE DRAWINGS

FIG. 4 illustrates an operation schedule of the vehicle 70 in a tabular form.

DESCRIPTION OF EXEMPLARY EMBODIMENTS

Hereinafter, the present invention will be described by way of embodiments of the invention, but the following embodiments are not intended to limit the invention according to the claims. In addition, not all combinations of features described in the embodiments are essential to the solution of the invention.

Figure 1:
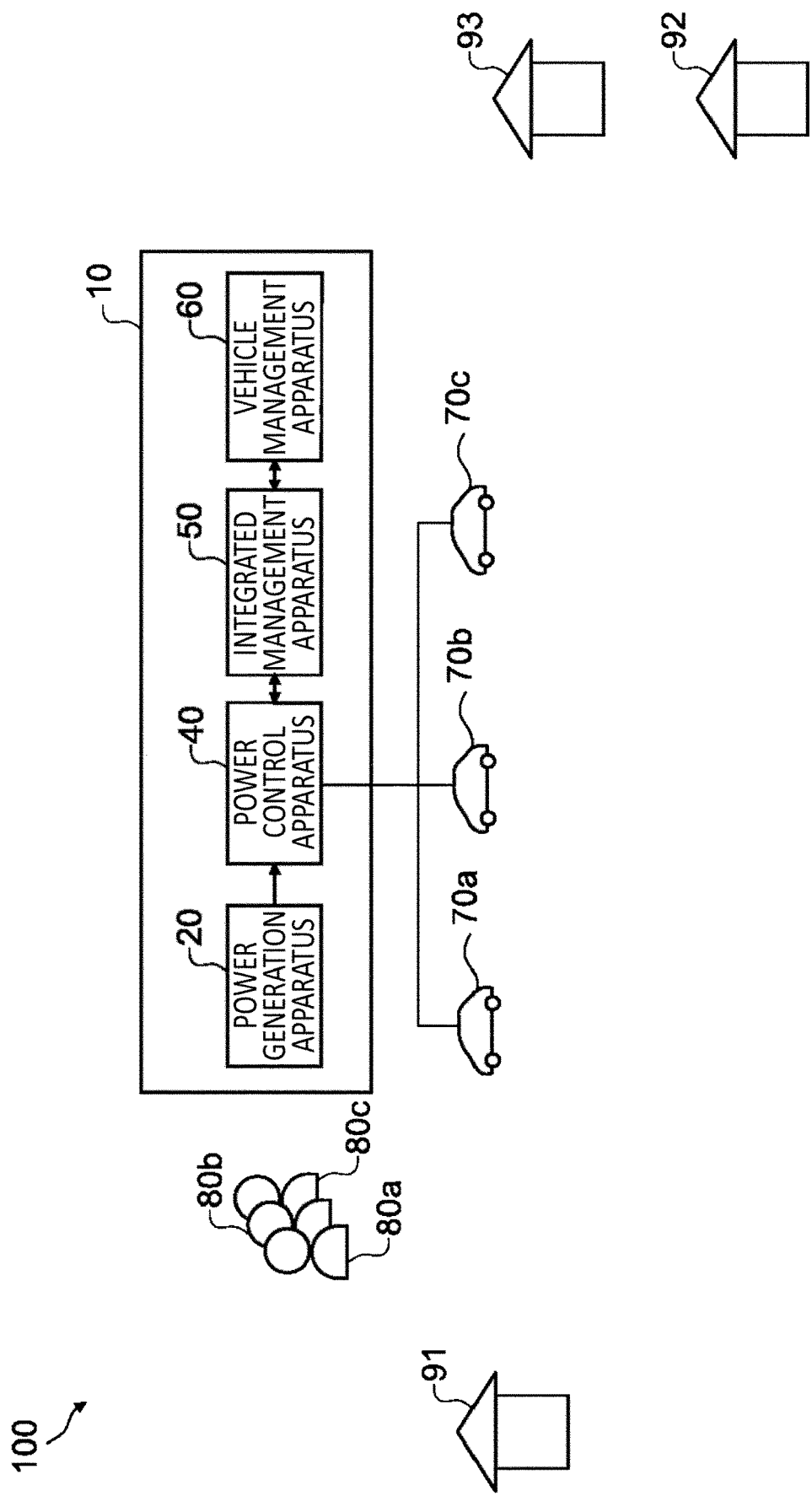
FIG. 1 conceptually illustrates a utilization form of a system 100 in an embodiment.

FIG. 1 conceptually illustrates a utilization form of a system 100 in an embodiment. The system 100 includes a power generation apparatus 20, a power control apparatus 40, an integrated management apparatus 50, and a vehicle management apparatus 60. The system 100 is a vehicle management system that manages a vehicle 70a, a vehicle 70b, and a vehicle 70c.

The power generation apparatus 20, the power control apparatus 40, the integrated management apparatus 50, and the vehicle management apparatus 60 are provided corresponding to an office 10. The office 10 is, for example, a factory. The office 10 may be any office such as an administration office, a commercial facility, or a station in addition to a factory.

In the present embodiment, the vehicle 70a, the vehicle 70b, and the vehicle 70c may be collectively referred to as "vehicle(s) 70". The vehicle 70 includes a battery. For example, the vehicle 70 is a vehicle including a traveling battery that accumulates driving power for traveling. The vehicle 70 is, for example, an electric car.

The vehicle 70 is a vehicle used in the office 10. For example, the vehicle 70 is a vehicle used by a user 80a, a user 80b, and a user 80c who work at the office 10. Specifically, the vehicle 70 can be used by the user 80a to commute between a home 91 of the user 80a and the office 10, can be used by the user 80b to commute between a home 92 of the user 80b and the office 10, and can be used by the user 80c to commute between a home 93 of the user 80c and the office 10. In the present embodiment, the user 80a, the user 80b, and the user 80c may be collectively referred to as "user(s) 80".

The power generation apparatus 20 is, for example, a power generation apparatus using renewable energy such as a solar power generation apparatus. The power control apparatus 40 adjusts the amount of power received from a power system according to the power demand in the office 10 and the amount of power generated by the power generation apparatus 20 so as to satisfy the power demand in the office 10. When a surplus of power occurs at the office 10, the power control apparatus 40 charges the battery included in the vehicle 70 with the surplus power.

The vehicle management apparatus 60 manages the operation of the vehicle 70 in the office 10. The vehicle management apparatus 60 manages which vehicle 70 is used for each of the users 80 to commute. The integrated management apparatus 50 performs arbitration between the control of the vehicle management apparatus 60 and the control of the power control apparatus 40. For example, the integrated management apparatus 50 controls the vehicle management apparatus 60 to acquire the operation information of the vehicle 70 executed in the vehicle management apparatus 60, and provides information for deciding how the power control apparatus 40 uses the battery included in the vehicle 70.

Figure 2:
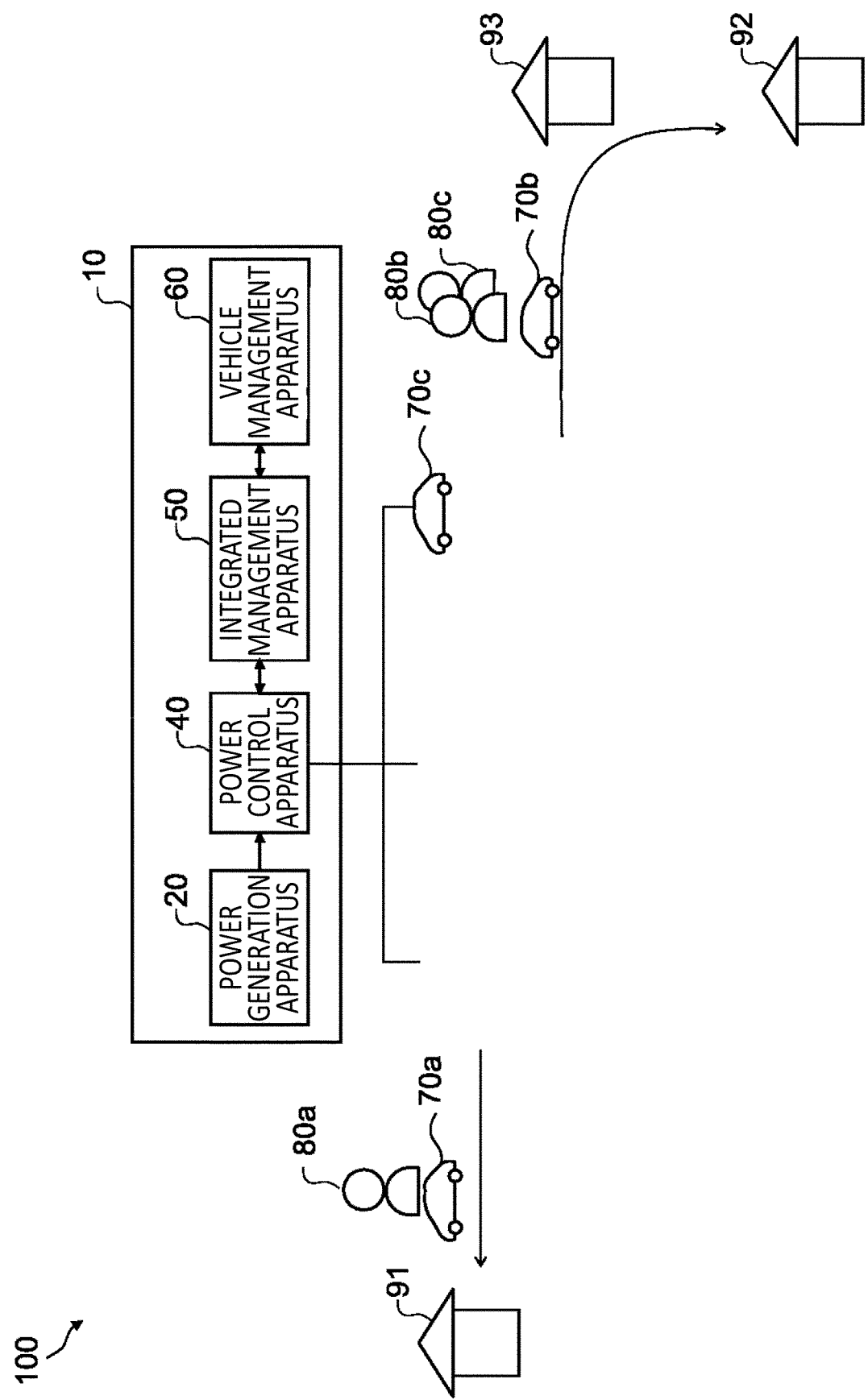
FIG. 2 schematically illustrates a scene where a user 80 uses a vehicle 70 to return home on Friday.

FIG. 2 schematically illustrates a scene where the user 80 uses the vehicle 70 to return home on Friday. In the present embodiment, it is assumed that the work days of the office 10 are Monday to Friday, and the non-work days of the office 10 are Saturday and Sunday. On Saturday and Sunday, since they are the non-work days of the office 10, the power demand in the office 10 is small. Accordingly, on Saturday and Sunday, surplus power is generated at the office 10 by the power generation apparatus 20 generating power.

After the end of work on Friday, in cooperation with the integrated management apparatus 50 and the power control apparatus 40, the vehicle management apparatus 60 decides not to use the vehicle 70c when the user 80 returns home, and to retain the vehicle at the office 10 on Saturday and Sunday. For example, in cooperation with the integrated management apparatus 50 and the power control apparatus 40, the vehicle management apparatus 60 makes an operation plan such that the user 80a uses the vehicle 70a to return home and the user 80b and the user 80c use one vehicle 70b to return home on Friday. In addition, in cooperation with the integrated management apparatus 50 and the power control apparatus 40, the vehicle management apparatus 60 makes an operation plan such that the user 80a uses the vehicle 70a to go to the office 10, and the user 80b and the user 80c use one vehicle 70b to go to the office 10 at the time of going to work on Monday of the next week. In addition, in cooperation with the vehicle management apparatus 60 and the integrated management apparatus 50, the power control apparatus 40 performs control to use the surplus power generated by power generation by the power generation apparatus 20 to charge the battery of the vehicle 70c on Saturday and Sunday.

According to the system 100, it is possible to efficiently operate the battery included in the vehicle 70 used in the office 10 and to effectively use the surplus power generated on the non-work day of the office 10.

Figure 3:
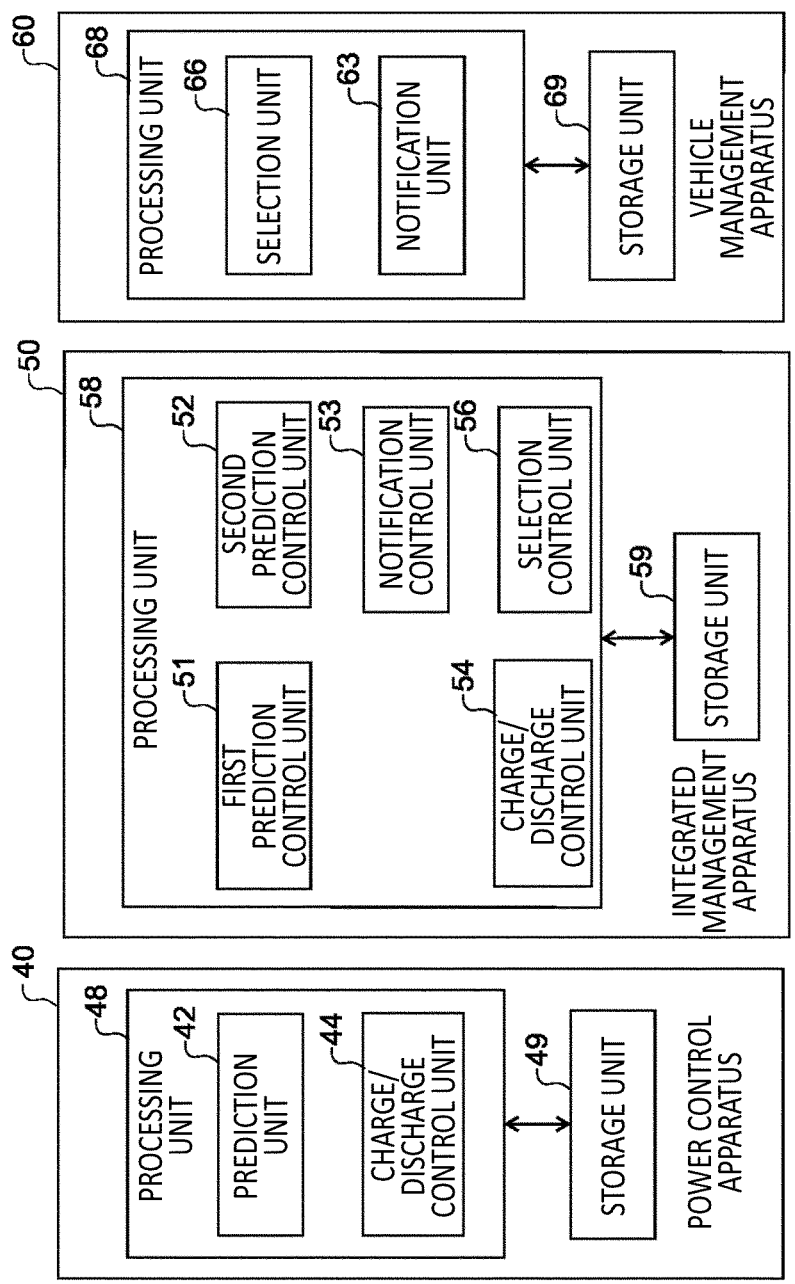
FIG. 3 illustrates an example of a system configuration for implementing control functions of a power control apparatus 40, an integrated management apparatus 50, and a vehicle management apparatus 60 configuring the system 100.

FIG. 3 illustrates an example of a system configuration for implementing control functions of the power control apparatus 40, the integrated management apparatus 50, and the vehicle management apparatus 60 constituting the system 100.

The power control apparatus 40 includes a processing unit 48 and a storage unit 49. The processing unit 48 includes a prediction unit 42 and a charge/discharge control unit 44. The integrated management apparatus 50 includes a processing unit 58 and a storage unit 59. The processing unit 58 includes a first prediction control unit 51, a second prediction control unit 52, a notification control unit 53, a selection control unit 56, and a charge/discharge control unit 54. The vehicle management apparatus 60 includes a processing unit 68 and a storage unit 69. The processing unit 68 includes a selection unit 66 and a notification unit 63.

The processing unit 48, the processing unit 58, and the processing unit 68 are each realized by an arithmetic processing apparatus including a processor. Each of the storage unit 49, the storage unit 59, and the storage unit 69 is realized by including a nonvolatile storage medium. The processing unit 48 performs processing by using the information stored in the storage unit 49. The processing unit 58 performs processing by using the information stored in the storage unit 59. The processing unit 68 performs processing by using the information stored in the storage unit 69. The power control apparatus 40, the integrated management apparatus 50, and the vehicle management apparatus 60 may be realized by a computer.

In the present embodiment, the power control apparatus 40, the integrated management apparatus 50, and the vehicle management apparatus 60 are each realized by separate computers. However, in another embodiment, the power control apparatus 40, the integrated management apparatus 50, and the vehicle management apparatus 60 may be realized by one computer. In addition, at least some of the functions of the power control apparatus 40, the integrated management apparatus 50, and the vehicle management apparatus 60 may be realized by a server such as a cloud server.

In the integrated management apparatus 50, the first prediction control unit 51 causes a prediction for the amount of surplus power generated at the office 10 on the non-work day of the office 10. The second prediction control unit 52 causes a prediction for a power capacity that can be accumulated by each of a plurality of vehicles 70 at the office 10 on the non-work day. For example, the first prediction control unit 51 causes the power control apparatus 40 to predict the amount of surplus power generated at the office 10 on the non-work day of the office 10. In addition, the second prediction control unit 52 causes the power control apparatus 40 to predict the power capacity that can be accumulated by each of the plurality of vehicles 70 at the office 10 on the non-work day. Note that the amount of surplus power generated at the office may be predicted on the basis of weather information and the power consumption amount of the office 10 in the past. The power capacity that can be accumulated by each of the plurality of vehicles 70 may be predicted on the basis of the amount of power consumed from the battery included in the vehicle 70 at the time of commuting.

In the power control apparatus 40, the prediction unit 42 predicts the amount of surplus power generated at the office 10 on the non-work day of the office 10 on the basis of the instruction of the first prediction control unit 51. In addition, on the basis of the instruction of the second prediction control unit 52, the prediction unit 42 predicts the power capacity that can be accumulated by each of the plurality of vehicles 70 at the office 10 on the non-work day.

The selection control unit 56 of the integrated management apparatus 50 causes a to-be-retained vehicle, which is to be retained at the office 10 on the non-work day, to be selected from among the plurality of vehicles 70 on the basis of the amount of surplus power generated at the office 10 on the non-work day and the power capacity that can be accumulated by each of the plurality of vehicles 70 at the office 10 on the non-work day. For example, the selection control unit 56 causes the vehicle management apparatus 60 to select a to-be-retained vehicle, which is to be retained at the office 10 on the non-work day, from among the plurality of vehicles 70. In the vehicle management apparatus 60, the selection unit 66 selects the to-be-retained vehicle which is to be retained at the office 10 on the non-work day.

The selection control unit 56 may cause as many vehicles as the number corresponding to the amount of surplus power generated at the office 10 on the non-work day to be selected from among the plurality of vehicles 70, on the basis of (i) the amount of surplus power generated at the office 10 on the non-work day and (ii) the power capacity that can be accumulated by each of the plurality of vehicles 70 at the office 10 on the non-work day.

The charge/discharge control unit 54 causes an adjustment for an amount of charging/discharging the to-be-retained vehicle 70 on the work day of the office 10 such that the free capacity (available space able to be charged) of the battery included in the to-be-retained vehicle becomes equal to or less than a predetermined value before the non-work day. For example, the charge/discharge control unit 54 causes the power control apparatus 40 to adjust the amount of charging/discharging the to-be-retained vehicle 70 on the work day of the office 10. According to an instruction from the charge/discharge control unit 54, in the power control apparatus 40, the charge/discharge control unit 44 adjusts the amount of charging/discharging the to-be-retained vehicle 70 on the work day of the office 10 such that the free capacity of the battery included in the to-be-retained vehicle becomes equal to or less than the predetermined value before the non-work day.

When the remaining capacity (available amount of remaining charge) of the battery included in the to-be-retained vehicle on the work day of the office 10 becomes higher than the predetermined value, the selection control unit 56 of the integrated management apparatus 50 causes another vehicle 70, which includes a battery having a remaining capacity lower than the predetermined value, to be selected from among the plurality of vehicles 70 as a new to-be-retained vehicle to be retained at the office 10 on the non-work day. The selection control unit 56 causes the vehicle management apparatus 60 to select the another vehicle 70 as the new to-be-retained vehicle to be retained at the office 10 on the non-work day. According to an instruction from the selection control unit 56, the selection unit 66 selects, as the new to-be-retained vehicle to be retained at the office 10 on the non-work day, another vehicle 70, which includes a battery having a remaining capacity lower than the predetermined value, from among the plurality of vehicles 70.

When the remaining capacity of the battery of the to-be-retained vehicle on the work day of the office 10 becomes higher than the predetermined value, the charge/discharge control unit 54 causes another vehicle 70, which includes a battery having a remaining capacity lower than the predetermined value, among the plurality of vehicles 70 to be supplied with power from the to-be-retained vehicle. For example, the charge/discharge control unit 54 causes the power control apparatus 40 to supply power from the to-be-retained vehicle to another vehicle 70, which includes a battery having a remaining capacity lower than the predetermined value, among the plurality of vehicles 70. When the remaining capacity of the battery of the to-be-retained vehicle on the work day of the office 10 becomes higher than the predetermined value, according to an instruction from the charge/discharge control unit 54, the charge/discharge control unit 44 performs control to supply power from the to-be-retained vehicle to another vehicle 70, which includes a battery having a remaining capacity lower than the predetermined value, among the plurality of vehicles 70.

The notification control unit 53 causes the user 80 of the to-be-retained vehicle to be notified to connect the to-be-retained vehicle 70 to the power supply system of the office 10 before the non-work day. The notification control unit 53 causes the vehicle management apparatus 60 to be notified to connect the to-be-retained vehicle 70 to the power supply system of the office 10 before the non-work day. According to an instruction from the notification control unit 53, the notification unit 63 makes a notification to connect the to-be-retained vehicle 70 to the power supply system of the office 10 before the non-work day. The notification unit 63 may notify a mobile terminal of the user 80 to connect the to-be-retained vehicle 70 to the power supply system of the office 10.

The selection control unit 56 causes another vehicle 70, which is used for the user of the to-be-retained vehicle to commute by ride-sharing on the days before and after the non-work day (the holiday of the office 10), from among the users of the plurality of vehicles 70 to be selected on the basis of the commuting routes of the users 80 of the plurality of vehicles 70 and the remaining capacities of the batteries included in the plurality of vehicles 70. For example, the selection control unit 56 causes the vehicle management apparatus 60 to select, from among the users of the plurality of vehicles 70, another vehicle 70 which is used for the user of the to-be-retained vehicle to commute by ride-sharing on the days before and after the non-work day. According to an instruction from the selection control unit 56, the selection unit 66 selects, from the plurality of vehicles 70, another vehicle 70, which is used for the user of the to-be-retained vehicle to commute by ride-sharing on the days before and after the non-work day, on the basis of the commuting routes of the users 80 of the plurality of vehicles 70 and the remaining capacities of the batteries included in the plurality of vehicles 70. The information indicating the commuting route of the user 80 may be stored in the storage unit 69 in advance.

The selection control unit 56 causes acquisition of information indicating a combination of users, who desire ride-sharing, among the users of the plurality of vehicles 70, and causes another user, who can perform the ride-sharing with the user of the to-be-retained vehicle 70 on the days before and after the non-work day, to be selected on the basis of the combination of the users who desire ride-sharing. The selection control unit 56 causes the vehicle management apparatus 60 to acquire the information indicating a combination of users, who desire ride-sharing, among the users of the plurality of vehicles 70 and to select another user, who can perform the ride-sharing with the user of the to-be-retained vehicle 70 on the days before and after the non-work day, on the basis of the combination of the users who desire ride-sharing. According to the instruction from the selection control unit 56, the selection unit 66 causes the vehicle management apparatus 60 to acquire the information indicating a combination of users, who desire ride-sharing, among the users of the plurality of vehicles 70 and to select another user, who can perform the ride-sharing with the user of the to-be-retained vehicle 70 on the days before and after the non-work day, on the basis of the combination of the users who desire ride-sharing.

FIG. 4 illustrates an operation schedule of the vehicle 70 in a tabular form. In particular, the operation schedule of FIG. 4 shows a case where the vehicle 70c is selected as the to-be-retained vehicle to be retained at the office 10 on Saturday and Sunday.

Specifically, the vehicle 80a is selected as a vehicle to be used for the user 70a to commute at the time of both going to work and leaving work time from Monday to Friday. On the other hand, the vehicle 70b is selected as a vehicle which is used for the user 80b and the user 80c to commute by ride-sharing at the time of going to work on Monday and leaving work on Friday, and is selected as a vehicle which is used for the user 80b to commute at the time of leaving work on Monday, at the time of going to work and leaving work from Tuesday to Thursday, and at the time of going to work on Friday. In addition, the vehicle 70c is selected as a vehicle which is used for the user 80c to commute at the time of leaving work on Monday, at the time of going to work and leaving work from Tuesday to Thursday, and at the time of going to work on Friday, and is selected as a to-be-retained vehicle to be retained at the office 10 from the time of leaving work on Friday to the time of leaving work on Monday of the next week.

Figure 5:
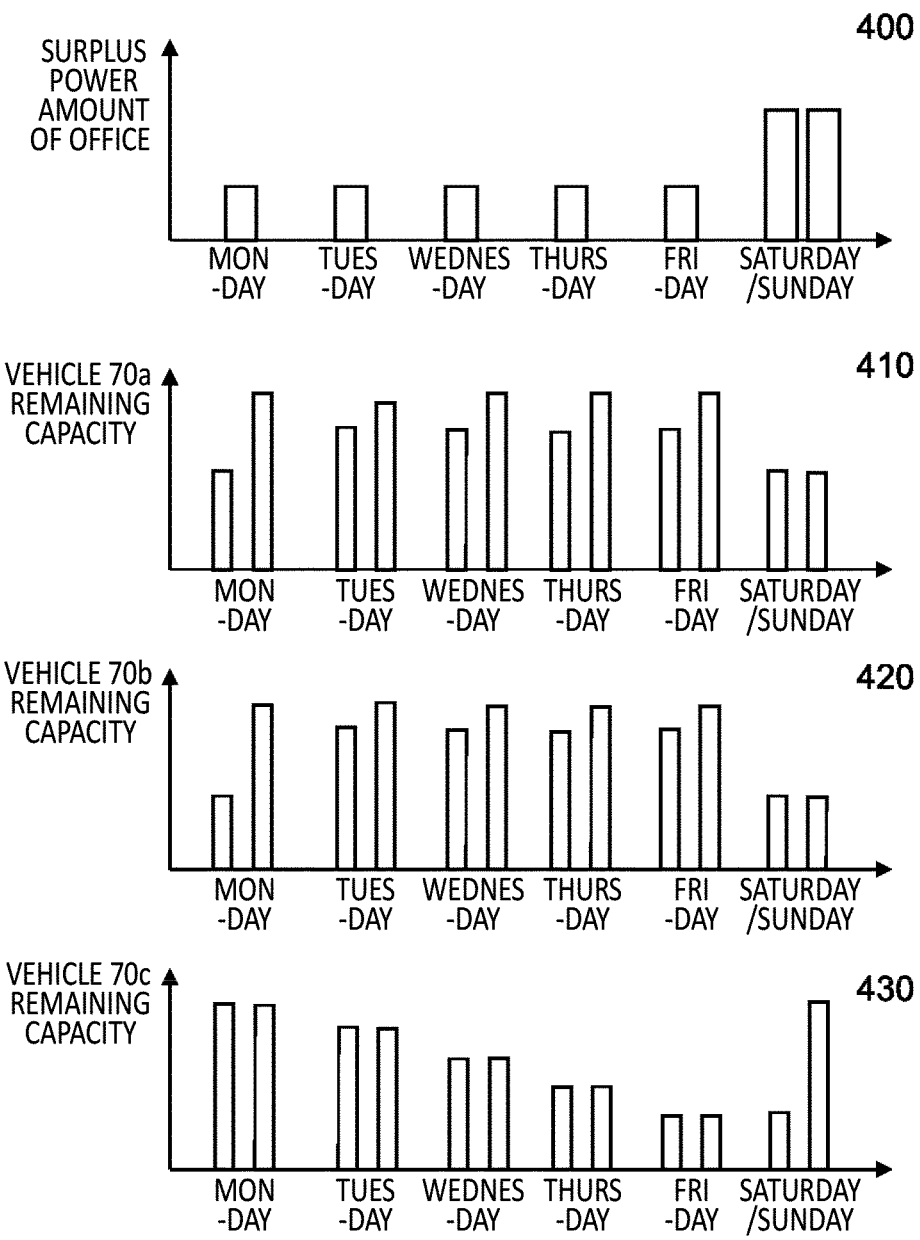
FIG. 5 schematically illustrates a temporal change of surplus power generated at an office 10 for each day of the week, and a temporal change of a remaining capacity of a battery included in the vehicle 70 for each day of the week.

FIG. 5 schematically illustrates a temporal change of the surplus power generated at the office 10 for each day of the week and a temporal change of the remaining capacity of the battery included in the vehicle 70 for each day of the week.

A graph 400 shows a temporal change of the amount of surplus power generated at the office 10 for each day of the week. The power consumption of the office 10 on Saturday and Sunday which are the non-work days of the office 10 is small as compared to the power consumption area of the office 10 in the period from Monday to Friday which are the work days of the office 10. Therefore, a difference between the amount of power generated by the power generation apparatus 20 and the amount of power consumed by the office 10 increases on the non-work day of the office 10 as compared to the work day of the office 10. Accordingly, in general, as shown in the graph 400, the surplus power generated at the office 10 is large on the non-work day of the office 10 as compared to the work day of the office 10.

A graph 410 shows a temporal change of the remaining capacity of the battery included in the vehicle 70*a* for each day of the week. A graph 420 shows a temporal change of the remaining capacity of the battery included in the vehicle 70*b* for each day of the week. A graph 430 shows a temporal change of the remaining capacity of the battery included in the vehicle 70*c* for each day of the week. The horizontal axes of the graph 400, the graph 410, the graph 420, and the graph 430 represent days of a week. The vertical axis of the graph 400 represents the amount of surplus power generated at the office 10. The vertical axes of the graph 410, the graph 420, and the graph 430 represent the amounts of the remaining capacities of the batteries included in the vehicle 70*a*, the vehicle 70*b*, and the vehicle 70*c*, respectively.

The graph 410, the graph 420, and the graph 430 show changes in the remaining capacity when the vehicle 70 is operated according to the operation schedule illustrated in FIG. 4. As shown in the graph 410, the charge/discharge control unit 54 causes the power control apparatus 40 to make a plan to charge the battery of the vehicle 70*a* with the surplus power of the office 10 from Monday to Friday. As a result, the user 80*a* can use the vehicle for commuting from Monday to Friday.

Similarly, as shown in the graph 420, the charge/discharge control unit 54 causes the power control apparatus 40 to make a plan to charge the battery of the vehicle 70*b* with the surplus power generated at the office 10 from Monday to Friday. As a result, the user 80*b* can use the vehicle for commuting from Monday to Friday. In particular, on Monday, the remaining capacity decreases due to the ride-sharing commuting of the user 80*b* and the user 80*c*, and thus the charge/discharge control unit 54 causes the power control apparatus 40 to preferentially charge the vehicle 70*b* on Monday.

As shown in the graph 430, the charge/discharge control unit 54 causes the power control apparatus 40 to make a plan so that the free capacity of the battery of the vehicle 70*c* becomes equal to or larger than a predetermined free capacity value by the time of leaving work on Friday. For example, the charge/discharge control unit 54 causes the power control apparatus 40 to make a plan so that the remaining capacity of the battery of the vehicle 70*c* becomes equal to or less than the predetermined remaining capacity value by the time of leaving work on Friday. For example, as shown in the graph 430, charging of the vehicle 70*c* is planned so that the remaining capacity of the battery of the vehicle 70*c* gradually decreases in a period from the time of leaving work on Monday to the time of going to work on Friday. As a result, on Saturday and Sunday, the battery of the vehicle 70*c* can be charged with the surplus power generated at the office 10.

Figure 6:
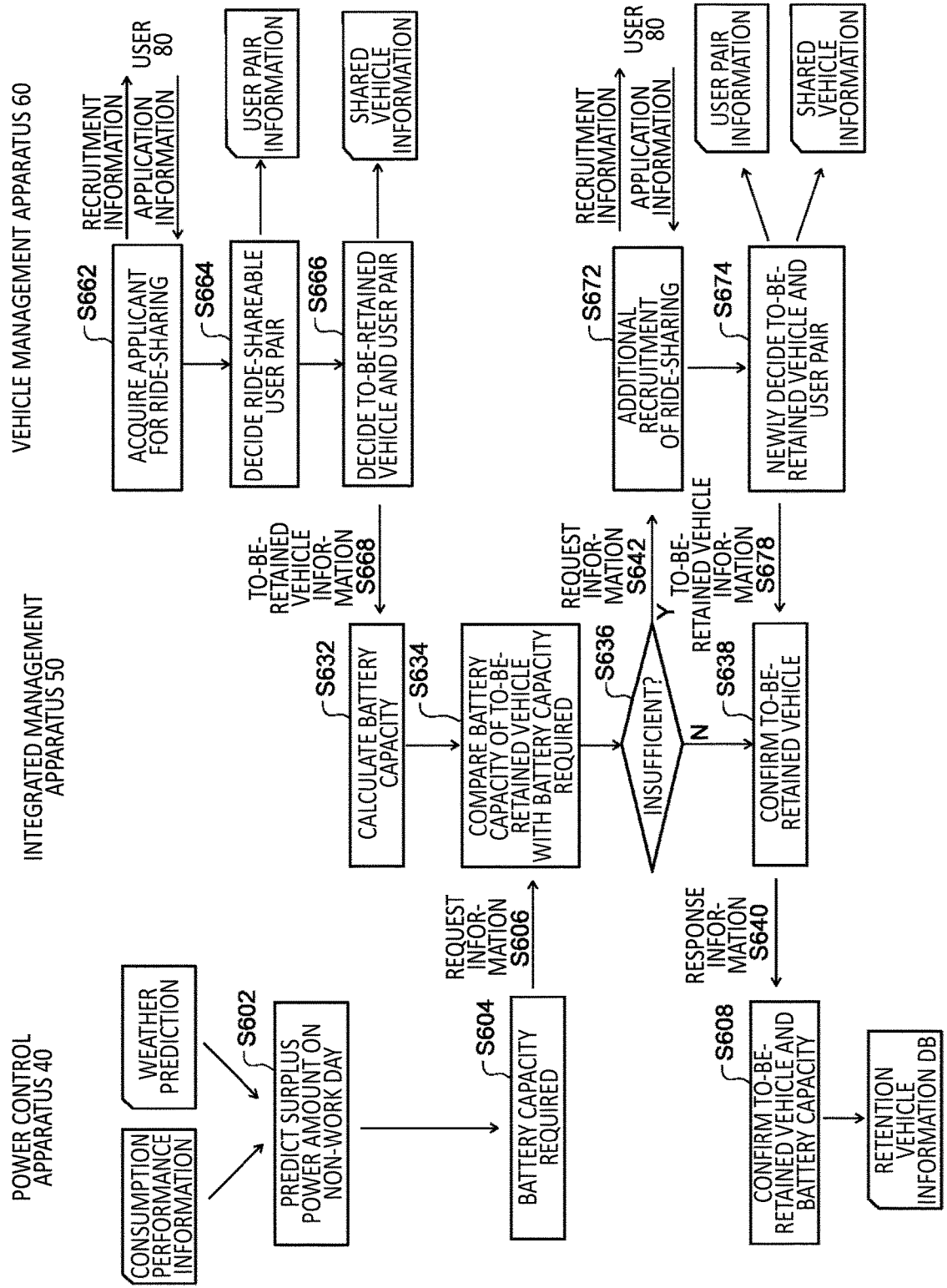
FIG. 6 illustrates a flow of processing for deciding a to-be-retained vehicle.

FIG. 6 illustrates a flow of processing for deciding the to-be-retained vehicle.

In S662, the selection unit 66 acquires information indicating a combination of users who desire to commute by ride-sharing. For example, the selection unit 66 transmits, to the mobile terminal used by the user 80, recruitment information indicating the recruitment of the user 80*b* or 80*c* for commuting by ride-sharing. When receiving the recruitment information with the mobile terminal, the user 80 uses the mobile terminal of the user 80 to set information indicating another user 80*b* or 80*c* with whom the user desires to commute by ride-sharing. The mobile terminal of the user 80 transmits, to the vehicle management apparatus 60, applicant information including the set information indicating another user 80*b* or 80*c*. As a result, the selection unit 66 acquires information indicating a combination of users who desire to commute by ride-sharing.

In S664, the selection unit 66 decides a combination of users who can commute by ride-sharing on the basis of the applicant information. For example, when the user 80*b* desires to commute with the user 80*c* by ride-sharing and the user 80*c* desires to commute with the user 80*b* by ride-sharing, the selection unit 66 decides the combination of the user 80*c* and the user 80*b* as a combination of users who can commute by ride-sharing. User pair information indicating the combination of the users decided by the selection unit 66 is stored in the vehicle management apparatus 60, and is used to manage the operation of the vehicle 70 and for the notification unit 63 to send a notification regarding ride-sharing to the user 80.

In S666, the selection unit 66 selects the to-be-retained vehicle from among the vehicles 70 used by the users 80 who can commute by ride-sharing. In addition, the selection unit 66 selects the vehicle 70 in which the user 80 of the to-be-retained vehicle rides together. Shared vehicle information indicating the vehicle 70 in which the user 80 of the retention vehicle selected by the selection unit 66 rides together is stored in the vehicle management apparatus 60, and is used to manage the operation of the vehicle 70 and for the notification unit 63 to send the notification regarding ride-sharing to the user 80.

In S668, the vehicle management apparatus 60 transmits, to the integrated management apparatus 50, retention vehicle information indicating the identification information of the to-be-retained vehicle selected in S666.

In S632, when receiving the retention vehicle information, the selection control unit 56 calculates a sum of the battery capacities of the retention vehicles.

In S602, the prediction unit 42 predicts the amount of surplus power generated at the office 10 on the non-work day of the office 10 on the basis of the instruction of the first prediction control unit 51. The prediction unit 42 predicts the amount of surplus power generated at the office 10 on the non-work day on the basis of the past actual power consumption data in the office 10, the weather prediction in the region where the office 10 exists, and the current date and time.

In S604, the prediction unit 42 calculates the battery capacity required in the office 10. For example, the prediction unit 42 calculates the battery capacity required to store the surplus power amount.

In S606, the prediction unit 42 transmits, to the integrated management apparatus 50, request information indicating the battery capacity calculated in S604.

When the integrated management apparatus 50 receives the request information from the power control apparatus 40, in S634, the selection control unit 56 compares the battery capacity requested by the request information with the total battery capacity of the to-be-retained vehicles. For example, the selection control unit 56 can calculate the total battery capacity of the to-be-retained vehicles on the basis of the identification information of the to-be-retained vehicles and the predetermined stored battery capacity of the vehicle 70.

In S636, the selection control unit 56 determines whether the total battery capacity of the scheduled vehicle is insufficient with respect compared to the battery capacity requested by the request information. For example, when the total battery capacity of the to-be-retained vehicles is equal to or more than the battery capacity requested by the request information, the selection control unit 56 determines that the total battery capacity of the to-be-retained vehicles is not insufficient with respect to the battery capacity requested by the request information. When the selection control unit 56 determines that the total battery capacity of the to-be-retained vehicle is not insufficient with respect to the battery capacity requested by the request information, the selection control unit confirms the to-be-retained vehicle in S638, and transmits, to the power control apparatus 40, the identification information of the to-be-retained vehicles and response information indicating the total battery capacity of the to-be-retained vehicle in S640.

When receiving the response information from the integrated management apparatus 50, in S608, the prediction unit 42 verifies the response information, and confirms the identification information of the to-be-retained vehicles and the total battery capacity of the to-be-retained vehicles. The prediction unit 42 stores, as a retention vehicle database that can be used on the non-work day, information including the total battery capacity of the to-be-retained vehicles and the identification information of the to-be-retained vehicles. The stored battery information is used for the control of the charge/discharge control unit 44.

When determining that the total battery capacity of the to-be-retained vehicles is insufficient with respect to the battery capacity requested by the request information in S636, the selection control unit 56 transmits, to the vehicle management apparatus 60, request information for adding the retention vehicle in S642.

When the vehicle management apparatus 60 receives the request information from the integrated management apparatus 50, information indicating a combination of new users who desire to commute by ride-sharing is acquired in S672. For example, similarly to S662, the selection unit 66 transmits, to the mobile terminal of the user 80, additional recruitment information indicating that the user 80 who commutes by ride-sharing is additionally recruited, and receives additional applicant information from the mobile terminal of the user 80.

In S674, the selection unit 66 decides a new combination of users who can commute by ride-sharing on the basis of the additional applicant information. In addition, the selection unit 66 selects a to-be-retained vehicle from among the vehicles 70 used by the users 80 who can commute by ride-sharing, and selects a vehicle 70 in which the user 80 of the retention vehicle rides together. User pair information indicating the combination of the users decided by the selection unit 66 and the shared vehicle information indicating the vehicle 70 in which the user 80 of the retention vehicle selected by the selection unit 66 rides together are stored in the vehicle management apparatus 60, and are used to manage the operation of the vehicle 70 and to send the notification regarding ride-sharing to the user 80.

In S678, the vehicle management apparatus 60 transmits, to the integrated management apparatus 50, the retention vehicle information indicating the identification information of the retention vehicle selected in S674. When receiving the retention vehicle information from the vehicle management apparatus 60, in S638, the integrated management apparatus 50 performs processing similar to S634 and S636 to confirm the to-be-retained vehicle.

Figure 7:
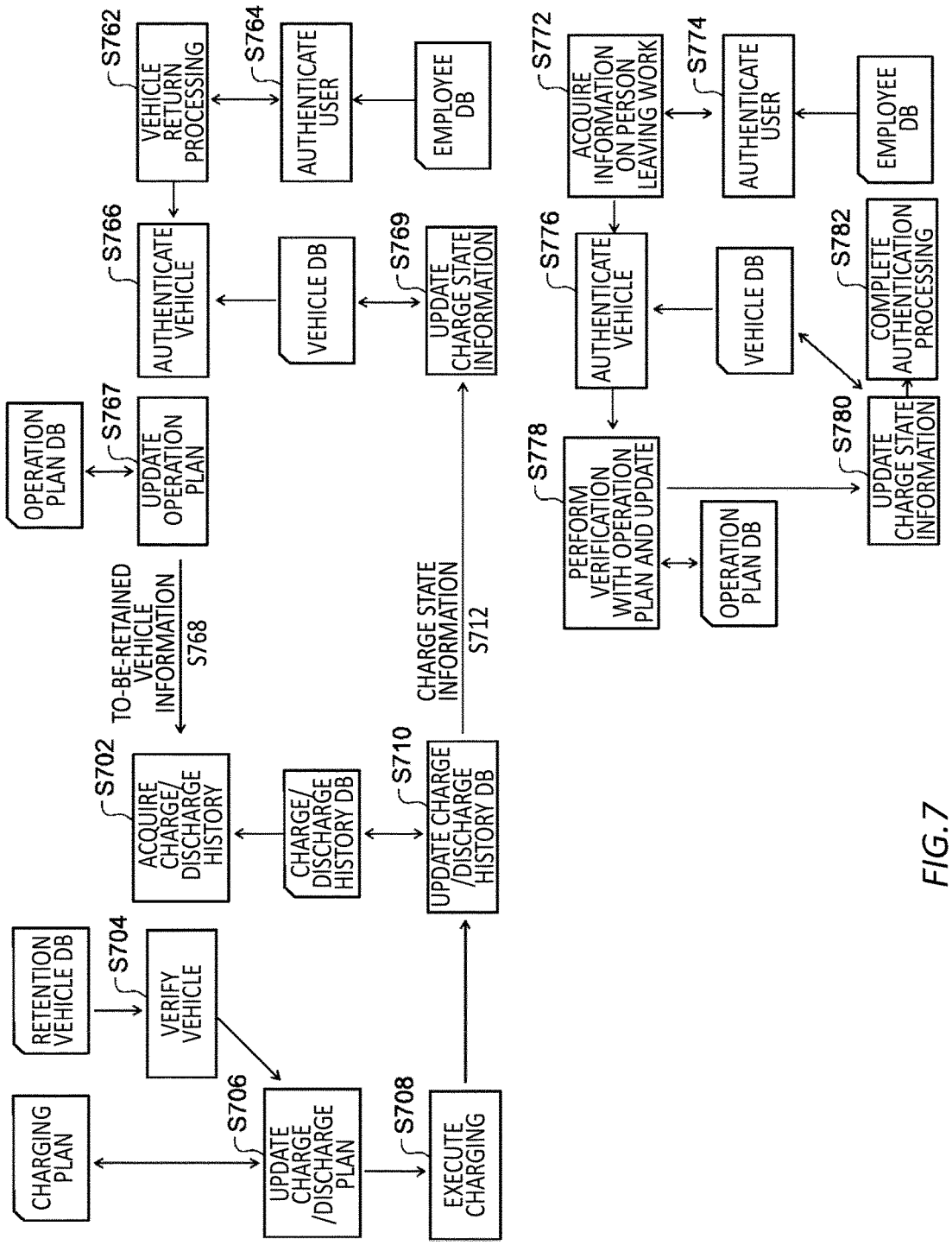
FIG. 7 illustrates a flow of the processing on a work day of the office 10.

FIG. 7 illustrates a flow of the processing on the work day of the office 10.

In S762, the vehicle management apparatus 60 performs processing of the user 80 returning the vehicle 70 to the office 10 when the user 80 goes to work. For example, the vehicle management apparatus 60 authenticates the user 80 by referring to the database of employees working in the office 10 (S764), and determines that the user 80 returns the vehicle 70 when the user 80 is authenticated.

In S766, the vehicle management apparatus 60 authenticates the vehicle 70 returned by the user 80 by referring to the vehicle database for managing the identification information of the vehicle 70.

When the authentication of the vehicle 70 is completed, the operation plan database of the vehicle 70 in the office 10 is updated in S767. The integrated management apparatus 50 transmits, to the power control apparatus 40, vehicle information including the identification information of the returned vehicle 70, the state of charge (SoC) of the battery included in the vehicle 70, and information of charge request until the next use of the vehicle 70 (S768).

When receiving the vehicle information from the vehicle management apparatus 60, in S702, the power control apparatus 40 acquires a charge/discharge history of the returned vehicle 70 by referring to a charge/discharge history database. The charge/discharge history database is a database that stores the charge/discharge history of each of the vehicles 70. The data of the charge/discharge history database is stored in the storage unit 49.

In S704, the charge/discharge control unit 44 verifies whether the returned vehicle 70 corresponds to the to-be-retained vehicle by referring to the retention vehicle database. In addition, when the returned vehicle 70 corresponds to the to-be-retained vehicle, the charge/discharge control unit 44 checks that the SoC of the battery of the vehicle 70 does not exceed a predetermined value. Herein, it is assumed that the SoC of the battery of the returned vehicle 70 does not exceed the predetermined value.

In S706, by referring to the current charging plan, the charge/discharge control unit 44 updates the plan for charging the vehicle 70 on the work day of the office 10 at least on and after the current day on the basis of the current charging plan and the verification result. In S708, the battery of the vehicle 70 is charged on the basis of the updated charging plan. After performing the charge control on the day, the charge/discharge control unit 44 updates the charge/discharge history database on the basis of the history of charge executed for the vehicle 70 on the day in S708 (S710). In addition, in S712, charge state information indicating the SoC of the battery of the vehicle 70 is transmitted to the vehicle management apparatus 60. Note that the charging plan indicates, for example, the amount of charge to be performed on the battery included in each of the vehicles 70 on each day of the week. The charging plan is planned by the charge/discharge control unit 44. The charging plan is updated by the charge/discharge control unit 44 each time the vehicle 70 moves. The data of the charging plan is stored in the storage unit 49.

When receiving the charge state information from the power control apparatus 40, the vehicle management apparatus 60 updates the SoC of the vehicle 70 (S769).

Subsequently, when the user 80 leaves work, processing for the vehicle 70 used for leaving work is performed at the time of leaving work. For example, when acquiring the identification information of the user 80 who leaves work (S772), the vehicle management apparatus 60 authenticates the user 80 who leaves work by referring to the database of employees working in the office 10 (S774), and when the user 80 is authenticated, the vehicle management apparatus determines that the user 80 leaves work by using the vehicle 70. Note that the employee database is a database that stores employee identification information. The data of the employee database is stored in the storage unit 69.

In S776, the vehicle management apparatus 60 authenticates the vehicle 70 used by the user 80 for leaving work by referring to the vehicle database for managing the identification information of the vehicle 70. The vehicle database is a database that stores the identification information of the vehicle 70, the capacity of the battery included in the vehicle 70, and the remaining capacity of the battery included in the vehicle 70 in association with each other. The data of the vehicle database is stored in the storage unit 69.

In S778, the vehicle management apparatus 60 performs verification with the operation plan by referring to the operation plan database and updates the operation plan database. In addition, in S780, the vehicle management apparatus 60 updates the vehicle database. For example, the vehicle management apparatus 60 updates the state of the vehicle 70 used for leaving work during use. Subsequently, in S782, the vehicle management apparatus 60 completes the authentication processing for using the vehicle 70 for leaving work.

Figure 8:
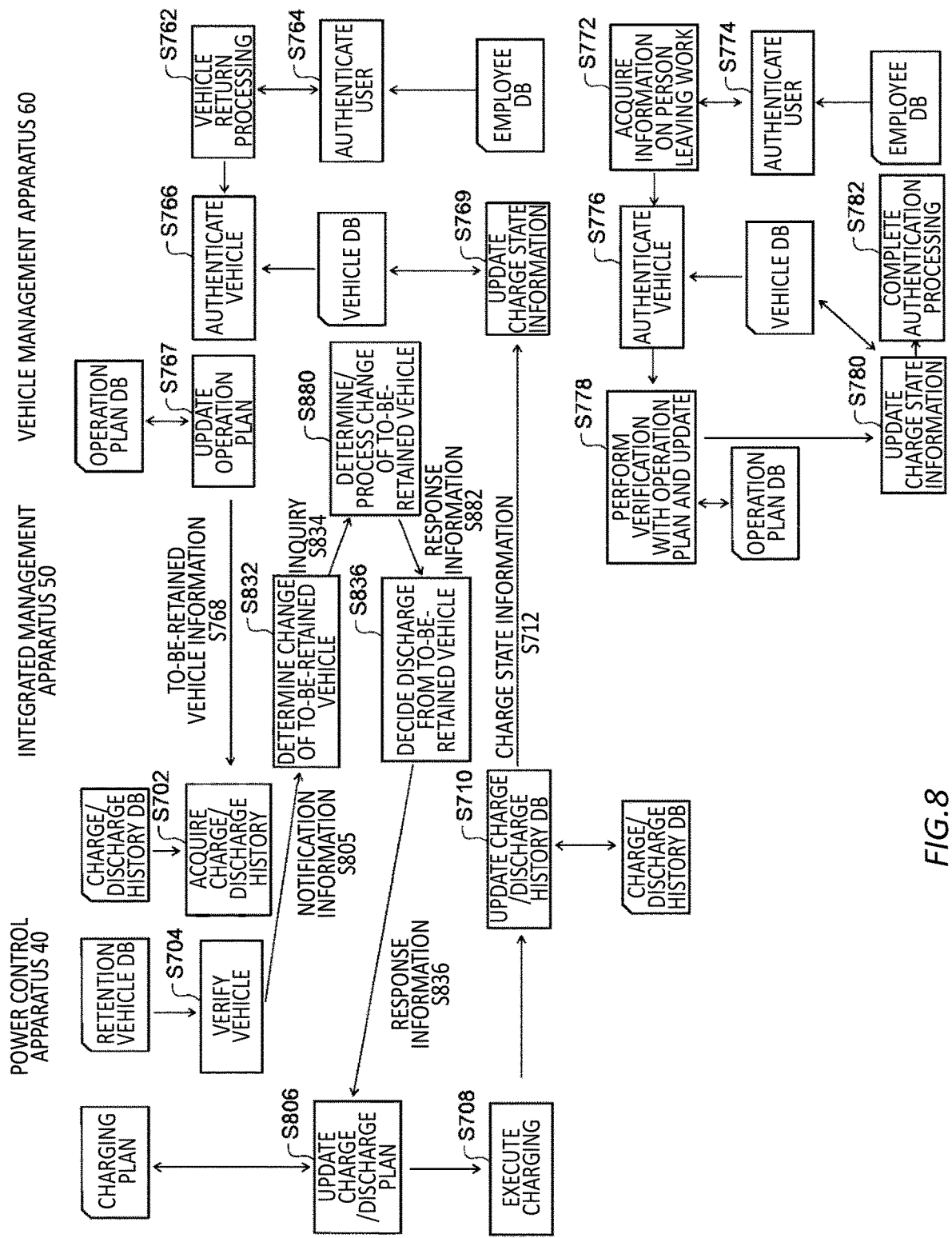
FIG. 8 illustrates a flow of the processing on the work day of the office 10.

FIG. 8 illustrates a flow of the processing on the work day of the office 10. Specifically, FIG. 8 describes the processing in a case where the vehicle 70 returned to the office 10 at the time of going to work is a to-be-retained vehicle, and the SoC of the battery of the returned vehicle 70 exceeds the predetermined value. In particular, FIG. 8 illustrates the flow of the processing in a case where the battery of another vehicle 70 is charged by using the battery of the to-be-retained vehicle. Note that, in the processing illustrated in FIG. 8, the same processing as the processing illustrated in FIG. 7 are denoted by the same reference numerals as those given in FIG. 7, and the description thereof will be omitted.

In the verification processing of S704, when it is determined that the vehicle 70 returned to the office 10 is a to-be-retained vehicle and the SoC of the battery of the returned vehicle 70 exceeds the predetermined value, the power control apparatus 40 transmits, to the integrated management apparatus 50, notification information indicating that the SoC of the vehicle 70 as the to-be-retained vehicle exceeds the predetermined value (S805).

In S832, the integrated management apparatus 50 determines whether or not the to-be-retained vehicle can be changed to another vehicle 70. Specifically, in S834, the integrated management apparatus 50 transmits, to the vehicle management apparatus 60, inquiry information as to whether or not the to-be-retained vehicle can be changed to another vehicle 70. In S880, the vehicle management apparatus 60 determines and processes whether or not to change the to-be-retained vehicle. Herein, it is assumed that the vehicle management apparatus 60 decides that the to-be-retained vehicle cannot be changed, and transmits, to the integrated management apparatus 50, response information indicating that the to-be-retained vehicle cannot be changed to another vehicle 70 (S882). Note that the determination as to whether or not the to-be-retained vehicle can be changed to another vehicle 70 will be described with reference to FIG. 9 and the like.

When the response information indicating that the to-be-retained vehicle cannot be changed to another vehicle 70 is received from the vehicle management apparatus 60 in S882, the integrated management apparatus 50 transmits, to the power control apparatus 40, the response information indicating that the battery of the vehicle 70 as the to-be-retained vehicle is discharged to charge the battery of another vehicle 70 (S836).

When receiving the response information from the integrated management apparatus 50 (S836), in S806, the power control apparatus 40 acquires the current charging plan, and updates the plan for charging the vehicle 70 on the work day of the office 10 at least on and after the current day on the basis of the current charging plan and the response information received in S836. The charging plan includes charge/discharge processing of discharging the battery of the vehicle 70 as the to-be-retained vehicle and charging the battery of another vehicle 70.

Figure 9:
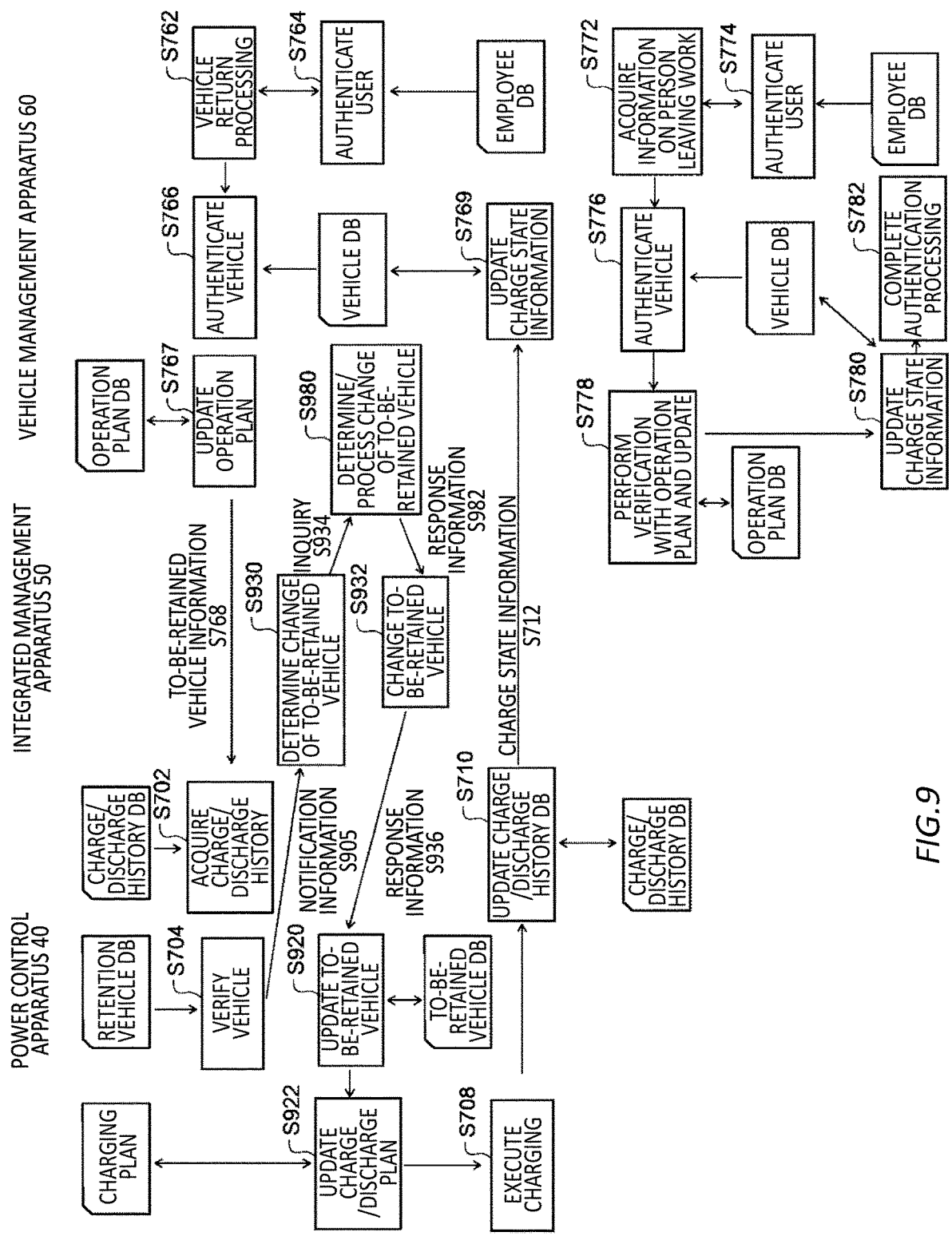
FIG. 9 illustrates a flow of the processing on the work day of the office 10.

FIG. 9 illustrates a flow of the processing on the work day of the office 10. Specifically, FIG. 9 describes the processing in a case where the vehicle 70 returned to the office 10 at the time of going to work is a to-be-retained vehicle, and the SoC of the battery of the returned vehicle 70 exceeds the predetermined value. In particular, FIG. 9 illustrates the flow of the processing in a case where the to-be-retained vehicle is changed to another vehicle 70. Note that, in the processing illustrated in FIG. 9, the same processing as the processing illustrated in FIG. 8 are denoted by the same reference numerals as those given in FIG. 8, and the description thereof will be omitted.

In the verification processing of S704, when it is determined that the vehicle 70 returned to the office 10 is a to-be-retained vehicle and the SoC of the battery of the returned vehicle 70 exceeds the predetermined value, the power control apparatus 40 transmits, to the integrated management apparatus 50, notification information indicating that the SoC of the vehicle 70 as the to-be-retained vehicle exceeds the predetermined value (S905).

In S930, the integrated management apparatus 50 causes the vehicle management apparatus 60 to determine whether or not the to-be-retained vehicle can be changed to another vehicle 70. Specifically, in S934, the integrated management apparatus 50 transmits inquiry information as to whether or not the to-be-retained vehicle can be changed to another vehicle 70.

When receiving the inquiry information, the vehicle management apparatus 60 determines whether or not the to-be-retained vehicle can be changed by referring to the operation plan database (S980). When there is the vehicle 70 having a SoC lower than the predetermined value, the vehicle management apparatus 60 determines that the to-be-retained vehicle can be changed. Specifically, when there is the vehicle 70 having a SoC lower than the predetermined value, the selection unit 66 selects, as a new to-be-retained vehicle, the vehicle 70 having a SoC lower than the predetermined value, and updates the operation plan database with the selected vehicle 70 as the to-be-retained vehicle. Note that the operation plan database is a database of plans indicating how to use the vehicle 70 for commuting. The data of the operation plan database is stored in the storage unit 69.

In S982, the vehicle management apparatus 60 transmits, to the integrated management apparatus 50, response information with respect to the inquiry information. The response information includes the identification information of the vehicle 70 newly selected as the to-be-retained vehicle. The integrated management apparatus 50 changes the to-be-retained vehicle (S932). The integrated management apparatus 50 transmits, to the power control apparatus 40, the response information including the identification information of the vehicle 70 selected as the new to-be-retained vehicle (S936).

When the power control apparatus 40 receives the response information from the integrated management apparatus 50, the charge/discharge control unit 44 updates the retention vehicle database in S920. In addition, the current charging plan is acquired, and the plan for charging the vehicle 70 on the work day of the office 10 at least on and after the current day is updated on the basis of the current charging plan and the to-be-retained vehicle information newly registered in S920 (S922). Note that the retention vehicle database is a database that stores identification information of the vehicle 70 selected as the to-be-retained vehicle. The data of the retention vehicle database is stored in the storage unit 49.

Figure 10:
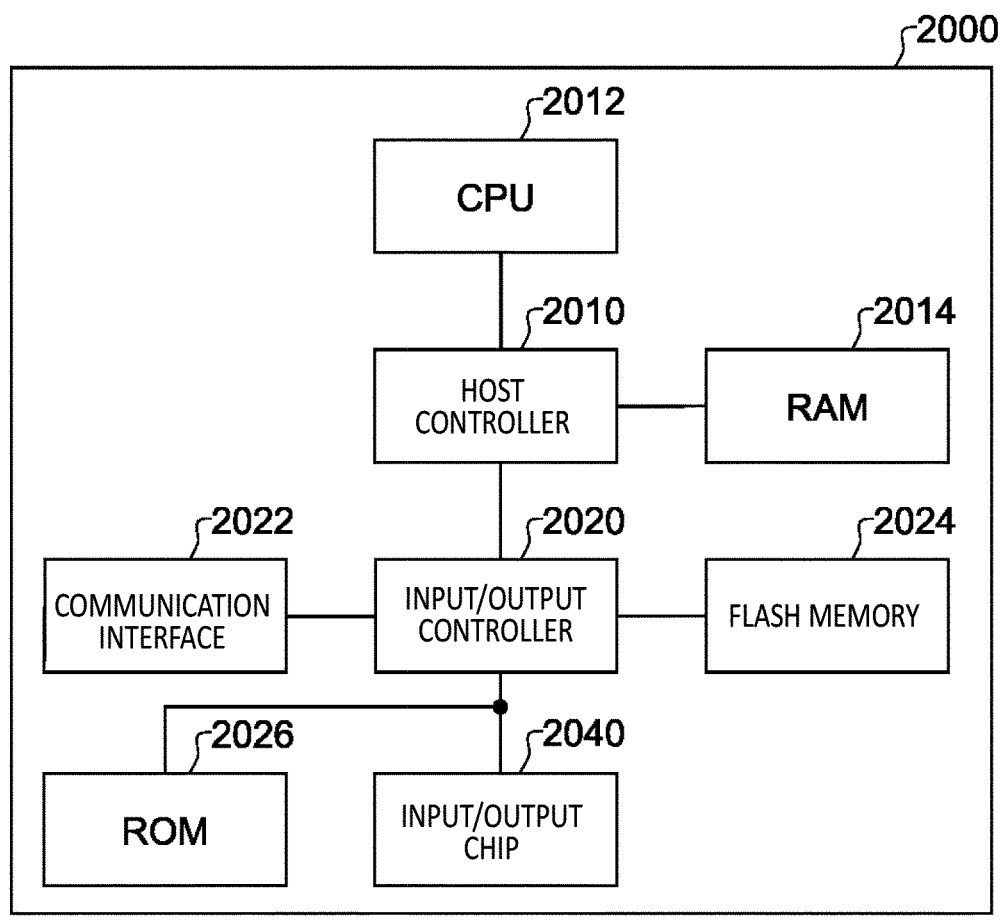
FIG. 10 illustrates an example of a computer 2000.

FIG. 10 illustrates an example of a computer 2000 in which a plurality of embodiments of the present invention may be entirely or partially embodied. A program installed in the computer 2000 can cause the computer 2000 to function as a system or each unit of the system, an apparatus such as various control apparatuses, or each unit of the apparatus according to the embodiment to execute an operation associated with the system or each unit of the system, the apparatus, or each unit of the apparatus and/or execute a process or a step of the process according to the embodiment. Such a program may be executed by a CPU 2012 in order to cause the computer 2000 to execute a specific operation associated with some or all of the blocks in the processing procedure and the block diagram described in the specification.

The computer 2000 according to the present embodiment includes the CPU 2012 and RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect, to the input/output controller 2020, a variety of input/output unit such as a keyboard, a mouse, and a monitor, via input/output ports such as a serial port, a parallel port, a keyboard port, a mouse port, a monitor port, a USB port, and HDMI (registered trademark) port.

A program is provided via a network or computer-readable storage media such as a CD-ROM, a DVD-ROM, or a memory card. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing described in the program is read by the computer 2000, thereby resulting in cooperation between the program and above-described various types of hardware resources. An apparatus or method may be constituted by implementing the operations or processing on information according to the use of the computer 2000.

For example, when communications are performed between the computer 2000 and external devices, the CPU 2012 may execute a communication program loaded in the RAM 2014, and instruct the communication interface 2022 to execute communication processing on based on the processing written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes a reception data received from the network into a reception buffer processing area or the like provided on the recording medium.

Also, the CPU 2012 may cause all or required portions of a file or a database stored in the recording medium such as the flash memory 2024 to be read by the RAM 2014, and perform various kinds of processing on the data on the RAM 2014. The CPU 2012, then, writes back the processed data into the recording medium.

Various types of programs and various types of information such as data, tables, and databases may be stored in the recording medium, and they may be performed information processing. The CPU 2012 may perform, on the data read from the RAM 2014, various kinds of processing including various kinds of operations, information processing, conditional judgments, conditional branching, unconditional branching, information searching/replacing and the like described in the specification and specified by an instruction sequence of the program, and writes back the result into the RAM 2014. Also, the CPU 2012 may search for information in a file, a database, etc., in the recording medium. For example, when a plurality of entries each having an attribute value of a first attribute respectively associated with an attribute value of a second attribute is stored in the recording medium, the CPU 2012 may search for, from among the plurality of entries, an entry in which the attribute value of the first attribute is specified and that match with a condition, read the attribute value of the second attribute stored in the entry, and thereby obtain the attribute value of the second attribute associated with the first attribute meeting a predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage media. A program stored in the computer-readable storage medium may be provided to the computer 2000 via a network.

The program installed in the computer 2000 to cause the computer 2000 to function as the power control apparatus 40 may work on the CPU 2012 or the like to cause the computer 2000 to function as each unit of the power control apparatus 40. The information processing described in these programs is read by the computer 2000 to function as each unit of the power control apparatus 40 which is a specific means in which software and the above-described various hardware resources cooperate. Then, when calculation or processing of information according to the use purpose of the computer 2000 in the present embodiment is realized by these specific means, the unique power control apparatus 40 according to the use purpose is constructed.

The program installed in the computer 2000 to cause the computer 2000 to function as the integrated management apparatus 50 may work on the CPU 2012 or the like to cause the computer 2000 to function as each unit of the integrated management apparatus 50. The information processing described in these programs is read by the computer 2000 to function as each unit of the integrated management apparatus 50 which is a specific means in which software and the above-described various hardware resources cooperate. Then, when calculation or processing of information according to the use purpose of the computer 2000 in the present embodiment is realized by these specific means, the unique integrated management apparatus 50 according to the use purpose is constructed.

The program installed in the computer 2000 to cause the computer 2000 to function as the vehicle management apparatus 60 may work on the CPU 2012 or the like to cause the computer 2000 to function as each unit of the vehicle management apparatus 60. The information processing described in these programs is read by the computer 2000 to function as each unit of the vehicle management apparatus 60 which is a specific means in which software and the above-described various hardware resources cooperate. Then, when calculation or processing of information according to the use purpose of the computer 2000 in the present embodiment is realized by these specific means, the unique vehicle management apparatus 60 according to the use purpose is constructed.

A variety of embodiments have been described with reference to the block diagram and the like. In the block diagram, each block may represent (1) a step of a process in which an operation is performed, or (2) each unit of the apparatus having a role of performing the operation. Certain steps and sections may be implemented by dedicated circuitry, programmable circuitry supplied with computer-readable instructions stored on computer-readable storage media, and/or processors supplied with computer-readable instructions stored on computer-readable storage media. The dedicated circuit may include a digital and/or analog hardware circuit, or may include an integrated circuit (IC) and/or a discrete circuit. The programmable circuit may include a reconfigurable hardware circuit including: logical AND, logical OR, exclusive OR (XOR), negative AND (NAND), negative OR (NOR), and other logical operation; and a memory element such as a flip-flop, a register, a field programmable gate array (FPGA), a programmable logic array (PLA); and so on.

Computer-readable storage media may include any tangible device that can store instructions for execution by a suitable device, such that the computer-readable storage medium having instructions stored therein forms at least a portion of an article of manufacture including instructions which can be executed to create means for performing processing operations or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

Computer-readable instructions may be provided to a general-purpose computer, a special-purpose computer, or a processor or a programmable circuit of other programmable data processing apparatus, locally or via a local area network (LAN), a wide area network (WAN) such as the internet, and computer-readable instructions may be executed in order to result in a means for executing operations specified by the described processing procedure or the block diagram. Examples of the processor include a computer processor, a processing unit, a microprocessor, a digital signal processor, a controller, a microcontroller, and the like.

While the embodiments of the present invention have been described, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each processing performed by an apparatus, system, program, and method shown in the claims, specification, or drawings can be performed in any order as long as the order is not indicated by "prior to," "before," or the like and as long as the output from previous processing is not used in later processing. Even if the process flow is described using phrases such as "first" or "next" in the claims, specification, or drawings, it does not necessarily mean that the process must be performed in this order.

EXPLANATION OF REFERENCES

10: office;
20: power generation apparatus;
40: power control apparatus;
42: prediction unit;
44: charge/discharge control unit;
48: processing unit;
49: storage unit;
50: integrated management apparatus;
51: first prediction control unit;
52: second prediction control unit;
53: notification control unit;
54: charge/discharge control unit;
56: selection control unit;
58: processing unit;
59: storage unit;
60: vehicle management apparatus;
63: notification unit;
66: selection unit;
68: processing unit;
69: storage unit;
70: vehicle;
80: user;
100: system;
2000: computer;
2010: host controller;
2012: CPU;
2014: RAM;
2020: input/output controller;

2022: communication interface;
2024: flash memory;
2026: ROM; and
2040: input/output chip.

What is claimed is:

1. A vehicle management apparatus configured to manage a plurality of vehicles used at an office, wherein
each of the plurality of vehicles includes a battery, the vehicle management apparatus comprising:
a first prediction control unit configured to cause a prediction for an amount of surplus power generated at the office on a non-work day of the office;
a second prediction control unit configured to cause a prediction for a power capacity that can be accumulated by the each of the plurality of vehicles at the office on the non-work day; and
a selection control unit configured to cause a to-be-retained vehicle to be retained at the office on the non-work day to be selected from among the plurality of vehicles on a basis of the amount of surplus power generated at the office on the non-work day and the power capacity that can be accumulated by the each of the plurality of vehicles at the office on the non-work day, wherein
the plurality of vehicles are vehicles used for employees of the office to commute, and
the selection control unit causes another vehicle, which is used for a user of the to-be-retained vehicle to commute by ride-sharing on days before and after the non-work day, to be selected from the plurality of vehicles on a basis of commuting routes of the users of the plurality of vehicles and remaining capacities of the batteries included in the plurality of vehicles.

2. The vehicle management apparatus according to claim 1, comprising
a charge/discharge control unit configured to cause an amount of charging/discharging the to-be-retained vehicle on a work day of the office to be adjusted such that a free capacity of a battery included in the to-be-retained vehicle becomes equal to or less than a predetermined value before the non-work day.

3. The vehicle management apparatus according to claim 2, wherein
when a remaining capacity of a battery included in the to-be-retained vehicle on the work day of the office becomes higher than a predetermined value, the selection control unit is configured to cause another vehicle, which includes a battery having a remaining capacity lower than the predetermined value, to be selected from among the plurality of vehicles as a new to-be-retained vehicle to be retained at the office on the non-work day.

4. The vehicle management apparatus according to claim 3, comprising
a charge/discharge control unit configured to cause, when the remaining capacity of the battery included in the to-be-retained vehicle on the work day of the office becomes higher than a predetermined value, another vehicle, which includes a battery having a remaining capacity lower than the predetermined value, among the plurality of vehicles to be supplied with power from the to-be-retained vehicle.

5. The vehicle management apparatus according to claim 3, further comprising
a notification control unit configured to cause a user of the to-be-retained vehicle to be notified to connect the to-be-retained vehicle to a power supply system of the office before the non-work day.

6. The vehicle management apparatus according to claim 2, comprising
a charge/discharge control unit configured to cause, when a remaining capacity of the battery included in the to-be-retained vehicle on the work day of the office becomes higher than a predetermined value, another vehicle, which includes a battery having a remaining capacity lower than the predetermined value, among the plurality of vehicles to be supplied with power from the to-be-retained vehicle.

7. The vehicle management apparatus according to claim 2, further comprising
a notification control unit configured to cause a user of the to-be-retained vehicle to be notified to connect the to-be-retained vehicle to a power supply system of the office before the non-work day.

8. The vehicle management apparatus according to claim 1, wherein
when a remaining capacity of a battery included in the to-be-retained vehicle on a work day of the office becomes higher than a predetermined value, the selection control unit is configured to cause another vehicle, which includes a battery having a remaining capacity lower than the predetermined value, to be selected from among the plurality of vehicles as a new to-be-retained vehicle to be retained at the office on the non-work day.

9. The vehicle management apparatus according to claim 8, comprising
a charge/discharge control unit configured to cause, when a remaining capacity of the battery included in the to-be-retained vehicle on the work day of the office becomes higher than a predetermined value, another vehicle, which includes a battery having a remaining capacity lower than the predetermined value, among the plurality of vehicles to be supplied with power from the to-be-retained vehicle.

10. The vehicle management apparatus according to claim 8, further comprising
a notification control unit configured to cause a user of the to-be-retained vehicle to be notified to connect the to-be-retained vehicle to a power supply system of the office before the non-work day.

11. The vehicle management apparatus according to claim 1, comprising
when a remaining capacity of the battery included in the to-be-retained vehicle on a work day of the office becomes higher than a predetermined value, a charge/discharge control unit configured to cause, from among the plurality of vehicles, another vehicle with a battery having a remaining capacity lower than the predetermined value to be supplied with power from the to-be-retained vehicle.

12. The vehicle management apparatus according to claim 11, further comprising
a notification control unit configured to cause a user of the to-be-retained vehicle to be notified to connect the to-be-retained vehicle to a power supply system of the office before the non-work day.

13. The vehicle management apparatus according to claim 1, further comprising
a notification control unit configured to cause a user of the to-be-retained vehicle to be notified to connect the to-be-retained vehicle to a power supply system of the office before the non-work day.

14. The vehicle management apparatus according to claim 1, wherein
the selection control unit is configured to cause acquisition of information indicating a combination of users, who desire ride-sharing, among the users of the plurality of vehicles, and to cause another user, who is capable of performing ride-sharing with the user of the to-be-retained vehicle on the days before and after the non-work day, to be selected on a basis of the combination of the users who desire ride-sharing.

15. A vehicle management method for managing a plurality of vehicles used at an office, performed by a vehicle management apparatus, wherein
each of the plurality of vehicles includes a battery, the vehicle management method comprising:
causing a prediction for an amount of surplus power generated at the office on a non-work day of the office;
causing a prediction for a power capacity that can be accumulated by the each of the plurality of vehicles at the office on the non-work day; and
causing a to-be-retained vehicle to be retained at the office on the non-work day to be selected from among the plurality of vehicles on a basis of the amount of surplus power generated at the office on the non-work day and the power capacity that can be accumulated by the each of the plurality of vehicles at the office on the non-work day, wherein
the plurality of vehicles are vehicles used for employees of the office to commute, and
the causing a to-be-retained vehicle to be retained at the office on the non-work day to be selected from among the plurality of vehicles includes causing another vehicle, which is used for a user of the to-be-retained vehicle to commute by ride-sharing on days before and after the non-work day, to be selected from the plurality of vehicles on a basis of commuting routes of the users of the plurality of vehicles and remaining capacities of the batteries included in the plurality of vehicles.

16. An energy management apparatus for a battery included in each of a plurality of vehicles used at an office, the energy management apparatus comprising:
a first prediction control unit configured to cause a prediction for an amount of surplus power generated at the office on a non-work day of the office;
a second prediction control unit configured to cause a prediction for a power capacity that can be accumulated by the each of the plurality of vehicles at the office on the non-work day; and
a selection control unit configured to cause as many vehicles as a number corresponding to the amount of surplus power generated at the office on the non-work day to be selected from among the plurality of vehicles on a basis of the amount of surplus power generated at the office on the non-work day and the power capacity that can be accumulated by the each of the plurality of vehicles at the office on the non-work day, wherein
the plurality of vehicles are vehicles used for employees of the office to commute, and
the selection control unit causes another vehicle, which is used for a user of the to-be-retained vehicle to commute by ride-sharing on days before and after the non-work day, to be selected from the plurality of vehicles on a basis of commuting routes of the users of the plurality of vehicles and remaining capacities of the batteries included in the plurality of vehicles.

* * * * *